3,184,519
SEPARATION OF METHYL BROMIDE FROM
ADMIXTURE WITH C₄ HYDROCARBONS
Cecil A. Newton and William H. Taylor, Houston, Tex.,
assignors to Petro-Tex Chemical Corporation, Houston,
Tex., a corporation of Delaware
No Drawing. Filed June 29, 1962, Ser. No. 206,165
12 Claims. (Cl. 260—683.3)

This invention relates to the purification of hydrocarbon streams by the separation of alkyl bromides from the hydrocarbons. More particularly, it relates to a process for the separation of methyl bromide from hydrocarbons of 4 carbon atoms.

The use of bromine or a bromine liberating material as a catalyst for the dehydrogenation of hydrocarbons to diolefins has been disclosed in copending applications. According to these applications, unsaturated compounds such as diolefins may be produced by reacting a mixture of the compound to be dehydrogenated, oxygen and a source of bromine at an elevated temperature. The effluent from the dehydrogenation zone or reactor comprises the unsaturated product, some unconverted feed and small amounts of inorganic bromides. The reactor effluent also contains organic alkyl bromides such as methyl bromide. Although these alkyl bromides are present in relatively small amounts, they are serious contaminates in the product and are difficult to remove. For example, the presence of the methyl bromide in the unsaturated product significantly affects the utility of the unsaturated products because the methyl bromide is corrosive and because the products are used, for example as monomers, and the presence of methyl bromide affects the polymerization rate of the monomer. Furthermore, methyl bromide is a valuable dehydrogenation catalyst and should be recovered in order to use it in the feed to the dehydrogenation zone.

The problem of the removal of water soluble inorganic bromides such as HBr and NH₄Br from the reactor effluent is different from that of the removal of methyl bromide. One distinction we have found is that methyl bromide behaves similarly to the organic product and consequently cannot be washed out with water. When a hydrocarbon effluent contaminated with methyl bromide is washed with water, essentially all of the methyl bromide goes through with the washed hydrocarbon.

The removal of methyl bromide from the reactor effluent is aggravated because the methyl bromide may be present in relatively small amounts based on the other possible components in the effluent such as unreacted feed, products such as monoolefins and diolefins, steam, nitrogen, oxygen and decomposition products. The methyl bromide compound may amount to only a few tenths percent or less of the effluent. We have found that methyl bromide is particularly difficult to separate from such compounds as n-butane and cis-butene-2, and this is one reason methyl bromide cannot be efficiently removed from the effluent by distillation.

It is an object of this invention to provide a process for the separation of methyl bromide from hydrocarbons. It is also an object of this invention to provide a method for the removal of both the inorganic and organic bromides from the reactor effluent of processes involving bromine catalysts. It is an object to reduce the total bromine content present in the product in all forms to only a negligible amount. It is also an object to provide a process for the recovery of bromine and bromine compounds from the effluent from dehydrogenation processes utilizing bromine liberating materials as catalysts. Another object is to provide an improved process for the removal of bromine and bromine compounds from dehydrogenation processes utilizing ammonium bromide as a catalyst. It is an additional object of this invention to devise a process for the recovery and reutilization of methyl bromide in dehydrogenation processes utilizing bromine liberating catalysts. Another object is to provide a method for the separation of methyl bromide from hydrocarbons of 4 carbon atoms, such as butenes and butadiene. Other objects of the invention will be evident from the discussion and claims which follow.

According to this invention a method has been discovered for the removal of methyl bromide from hydrocarbon compositions which contain some C₄ hydrocarbons and which are contaminated with methyl bromide. Broadly speaking, the process comprises contacting the hydrocarbon stream contaminated with methyl bromide with a particular type of aromatic contacting solvent in a distillation column. The added aromatic contacting solvent has a dielectric constant [1] of less than 9, measured at 25° C., and is a compound of the formula

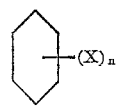

wherein X is selected from the group consisting of CH₃, Cl, Br, and NH₂ and n is a number from 0 to 2. The aromatic contacting solvent preferably will not form a minimum boiling point azeotrope with methyl bromide, and preferably will not form a constant boiling point azeotrope with either the C₄ hydrocarbon or the methyl bromide. The purified hydrocarbon stream goes off overhead and the methyl bromide dissolved in the added aromatic contacting liquid comes off as bottoms.

Processes for dehydrogenation utilizing bromine catalysts are described in the copending application of Laimonis Bajars and Russel M. Mantell, Serial No. 856,339, filed December 1, 1959, now abandoned, and the application of Richard J. Gay, Serial No. 36,705, filed June 17, 1960. According to these processes, the compound to be dehydrogenated together with oxygen and bromine as a catalyst is reacted at elevated temperatures to form a reaction mixture comprising unreacted feed, the unsaturated product and various bromine compounds. The source of bromine may be either elemental bromine or any compound of bromine which would liberate bromine under the conditions of reaction. Suitable sources of bromine are hydrogen bromide, elemental bromine; aliphatic bromides such as methyl bromide, 1-2-dibromo ethane, ethyl bromide, amyl bromide and allyl bromide; cycloaliphatic bromides such as cyclohexylbromide; aromatic bromides such as benzyl bromide; bromohydrins such as ethylene bromohydrin; bromine substituted aliphatic acids such as bromoacetic acid; ammonia bromide; organic amine bromide salts such as methyl amine hydrobromide; and the like. Mixtures of various bromine compounds may be used. The preferred sources of bromine are elemental bromine, hydrogen bromide, ammonium bromide, alkyl bromides of one to six carbon atoms and mixtures thereof. The amount of elemental bromine, or the equivalent amount of bromine compound, may be as little as about 0.001 or less mol of bromine per mol of hydrocarbon to be dehydrogenated, generally no more than about 0.10 mol or 0.20 mol of bromine per mol of hydrocarbon to be de-

[1] Dielectric constants of liquids may be found, for example, in the Table of Dielectric Constants of Pure Liquids, NBS Circular 514, published by the United States Department of Commerce, National Bureau of Standards, August 10, 1951.

hydrogenated are necessary, although larger amounts such as 0.5 mol may be used.

The oxygen may be supplied by any source such as pure oxygen or as air. The amount of oxygen will normally be in the range of about 0.25 mol of oxygen to 1.5 or 2.5 mols of oxygen per mol of hydrocarbon to be dehydrogenated. As high as 5 mols of oxygen and higher have been employed. In relation to bromine, the amount of oxygen employed will usually be greater than 1.25 mols of oxygen per atom of bromine. Usually the ratio of mols of oxygen to atoms of bromine will be from about 2 to 150 with the best results having been obtained at ratios between about 8 and 100 mols of oxygen per atom of bromine. Diluents such as steam, nitrogen, carbon dioxide or hydrocarbons may be included to reduce the partial pressure of the compound to be dehydrogenated to less than equivalent to about 10 or 15 inches of mercury absolute at a total pressure of one atmosphere. Desirable results have been obtained utilizing from about 3 to about 30 mols of steam per mol of compound to be dehydrogenated, and excellent results have been achieved with from about 5 to 20 mols of steam per mol of compound to be dehydrogenated.

These processes will normally be conducted at a temperature of reaction between about 450° C. to about 850° C. or higher, such as about 1000° C. The temperature of reaction is measured at the maximum temperature in the reactor. The flow rates of the reactants may be varied quite widely and can be established by those skilled in the art. Good results have been obtained with flow rates of the compound to be dehydrogenated ranging from about ¼ to 8 liquid volumes of compound per volume of reaction zone, with the volumes of liquid calculated at standard conditions of 760 mm. of mercury absolute at 25° C. If the reactor is unpacked the reaction zone is defined as the portion of the reactor which is at a temperature of at least 400° C. If the reactor is packed, the reaction zone is defined as the volume of reactor containing packing. The desired residence or contact time of the reactants in the reaction zone under any given set of reaction conditions depends on all the factors involved in the reaction. Contact times such as from about 0.01 to about 5 or 10 seconds have been found to give excellent results. Generally, the contact time will be between about 0.1 and one second. Contact time is the calculated dwell time of the reaction mixture in the reaction zone assuming the mols of product mixture are equivalent to the mols of feed. The preferred compounds to be dehydrogenated are aliphatic hydrocarbons of 2 to 6 carbon atoms, which contain at least two adjacent carbon atoms, each of which carbon atom has at least one hydrogen atom attached. Good results have been achieved with a feed of at least about 50 to 75 mol percent of a monoethylenically unsaturated aliphatic hydrocarbon, such as the hydrocarbons of from 4 to 5 carbon atoms containing a monoethylenically unsaturated straight chain of at least four carbon atoms. Thus, butadiene-1,3 and vinyl acetylene may be produced from butene-1 or butene-2 or mixtures thereof, and isoprene may be produced from any of the methyl butenes, such as 2-methyl butene-1, 2-methyl butene-2 or 2-methyl butene-3 or mixtures thereof. Isoprene may also be produced from methyl butanes, such as 2-methyl butane; also olefins and diolefins may be produced from saturated hydrocarbons, for example, butadiene and butene may be produced from n-butane. A mixture of monoolefins and diolefins may also be produced, such as a mixture of butadiene-1,3 and butenes from a feedstock of a mixture of n-butane and butene. The process of this invention is particularly useful for the removal of methyl bromide from the reactor effluent obtained from the dehydrogenation of hydrocarbons of 4 carbon atoms such as n-butane, butene-1 and butene-2.

The effluent from the reactor may be cooled to condense the water of the effluent in any conventional manner such as by the use of tube type condensers or refrigeration. Normally, the temperature to which the effluent is cooled will be to a temperature no greater than the boiling point of water under the conditions of condensation, but will not be a temperature low enough to condense the unsaturated organic compounds. That is, the temperature of the effluent will be cooled to a temperature of no greater than equivalent to 100° C. at atmospheric pressure.

The condensed water may be removed from the hydrocarbon vapor by the usual means known in the art such as by knock-out vessels and vapor separators. The separated water phase will contain the inorganic bromine materials such as hydrogen bromide, elemental bromine or ammonium bromide. Generally at least 90 or 95 weight percent of the inorganic bromine materials are removed prior to the treatment of the hydrocarbon phase of the effluent with the aromatic contacting solvent according to this invention.

The vapor phase from the vapor separators is usually then liquified, such as by compression, prior to further treatment to remove the methyl bromide. The compressed gases may then be treated with the aromatic contacting solvent in the distillation column. However, in the production of butadiene it is usually desirable to first remove the $C_3$ and lighter components from the mixture. The $C_3$ hydrocarbons may be removed according to techniques known in the art. One technique for the removal of $C_3$ hydrocarbons is to use an oil absorber column. In the column the lean oil, such as naphtha, absorbs essentially all of the $C_4$ and higher hydrocarbons and the lighter fractions are taken off overhead. The fat oil from the absorber may then be stripped to remove the $C_4$ and higher hydrocarbons from the oil. The overhead vapors may then be cooled and accumulated. The overhead from the stripper will contain concentrated butadiene contaminated with methyl bromide. In this overhead normally the concentration of butadiene will be at least 40 mol percent of the mixture and the methyl bromide will be less than five mol percent of the mixture. The overhead from the stripper may conveniently be used as the stream to be treated according to this invention to remove the methyl bromides.

The aromatic contacting liquid is contacted with the contaminated hydrocarbon in a distillation column. For example, the contaminated hydrocarbon may be continuously fed to a distillation column below the point of entry of the aromatic contacting liquid. The aromatic contacting liquid then flows downwardly in the column and thus contacts the rising stream of contaminated hydrocarbon. The aromatic contacting liquid containing the methyl bromide is then taken off as bottoms and the purified hydrocarbon is taken off overhead. Any aromatic contacting liquid which comes off overhead may be separated from the hydrocarbon such as by distillation in a second column to flash off the hydrocarbon overhead. Preferably the aromatic contacting liquid will not be added at the very top of the distillation column, but rather there will be some plates or packing above the inlet point for the aromatic contacting liquid in order that most or all of the aromatic contacting liquid is fractionated from the overhead vapors. Conventional distillation columns such as packed columns, bubble cap columns and other types known in the art may be utilized.

The operating details of the process such as temperatures at the top and bottom of the column, pressures, rate of feed of contaminated hydrocarbon and aromatic contacting liquid, ratios of ingredients taken off overhead and as bottoms, and so forth, will be dependent upon the process variables including the particular compositions being separated and the aromatic contacting liquid selected. These particular variables are subject to some choice. Generally the temperature at the top of the column will be within the range of about 10° C. and 125° C. and the temperature at the bottom of the column will be in the range of about 50 to 250° C. With the preferred solvents and operating conditions the temperature at the top of the column will ordinarily be within the range of 25° C. to 75° C. and the temperature at the bottom of the column within the range of about 100° C. to 200° C. Pressures within the column may be atmospheric, subatmospheric or superatmospheric such as within the range of 0 p.s.i.g. or less to 250 p.s.i.g.

It is an advantage of this invention that the separation of the methyl bromide from the hydrocarbon can be made efficiently with a relatively small amount of aromatic contacting liquid. Separation of methyl bromide may be obtained with from about 5 to 99 mol percent aromatic contacting solvent based on the total composition in the distillation column. However, it is an advantage of this invention that the separation may be made with relatively small amounts of aromatic contacting solvent such as from about 5 to 35 mol percent aromatic contacting solvent based upon the total composition in the distillation column.

Suitable aromatic contacting liquids are such as benzene, toluene, o-xylene, m-xylene, p-xylene, chlorobenzene, bromobenzene, m-dichlorobenzene, aniline, o-chlorotoluene, and the like. Mixtures of the described aromatic contacting liquids with each other may be employed. Furthermore, mixtures with water may be effectively utilized. Particularly desirable results may be obtained by such combinations of water and aromatic contacting liquid. If water is added, conveniently the water will be present in an amount between about 0.5 and 25 weight percent based on the total, but ordinarily the water will be present in an amount between 0.5 and 10 weight percent water. The treated hydrocarbon comes off overhead from the solvent contacting column.

The purified hydrocarbon product may be further purified by any of the methods known in the art for separating these hydrocarbon mixtures. For example, if butadiene is the desired product and the treated hydrocarbon may be extractively distilled to separate the butadiene from the remaining hydrocarbons. A normal feed to the extractive distillation column would comprise isobutylene, butene-1, butadiene-1,3, n-butane, trans-2-butene and cis-2-butene. This mixture is subjected to extractive distillation using an organic solvent such as furfural. Essentially all of the butadiene, and some of the 2-butenes are absorbed by the solvent, and the remainder of the $C_4$ hydrocarbons are removed as overhead. The butadiene containing solvent may then be fed to a solvent stripper that separates the $C_4$ hydrocarbons from the solvent. If desired, as a final step, the overhead product from the solvent stripper may be separated in a fractionating column. The 2-butenes comprise the bottom product of this column and the high purity butadiene is the overhead product.

Another well known method for the purification of the butadiene is the process of selective absorption with a cuprous salt solution. The butadiene in the treated hydrocarbon overhead from the aromatic solvent contacting column may be separated by such a process. The butadiene is preferentially absorbed in the cuprous salt solution and is stripped off after the other hydrocarbons have been stripped. As described above, the butadiene may then also be fractionated to remove residual hydrocarbons.

The bottoms from the aromatic solvent contacting distillation column contains the methyl bromide dissolved in the aromatic contacting solvent, together with a minor amount of hydrocarbons. The methyl bromide and the hydrocarbons may then be stripped from the aromatic contacting solvent such as in a fractionating column. The methyl bromide may then be utilized in any desired manner, but it is an advantage of this invention that it can be recycled directly to the dehydrogenation zone to act as a bromine liberating material.

The applicability of various aromatic contacting solvents was demonstrated in a small scale laboratory apparatus. The effect of the addition of solvents to a mixture to be separated in a distillation column can be demonstrated by an experimental determination of the relative volatilities, which are known as the alpha values. The alpha values were determined by the equilibrium technique. According to this technique a composition corresponding to that which is to be separated in a distillation column is enclosed in a container under such conditions that there will be a liquid phase and a vapor phase. After equilibrium has been reached, the vapor phase and the liquid phase are both analyzed to determine the relative amounts of each component in the vapor phase and in the liquid phase. The alpha value for the separation of components A and B is then calculated using the following relationship:

$$\alpha A, B = \frac{(\text{Mole percent A in vapor})(\text{mole percent B in liquid})}{(\text{Mole percent B in vapor})(\text{mole percent A in liquid})}$$

The run is then duplicated with the exception that the solvent for which the effect is to be determined is also added to the container. The alpha value of the new composition is then determined and compared to that obtained without the added solvent. In these examples the standard hydrocarbon blend composition to be separated consisted of, by mole percent, 8.68% n-butane, 4.55% trans butene-2, 4.63% cis butene-2, 73.03% butadiene-1,3, 3.72% vinylacetylene and 5.39% methyl bromide. The apparatus consisted of a 125 cc. glass pressure bottle equipped with a standard metal cap with a neoprene liner and 2 entry holes punched in the top. The bottle was capped and evaporated to 0.3 mm. mercury. The described liquid hydrocarbon blend composition was then added in a weighed quantity by means of a hypodermic syringe. The liquid phase comprised about 100 cc. The pressure bottle was then placed in a constant temperature bath of 140° F. The bottles were allowed to come to equilibrium in 3 hours. While still in the bath, a sample of the vapor was analyzed chromatographically and calculated as mole percent. The relative volatilities between methyl bromide and the various $C_4$ hydrocarbons were calculated, for example, with butadiene-1,3.

$$\alpha \text{ between methyl bromide and butadiene} = \frac{\left(\begin{array}{c}\text{Mole percent methyl}\\\text{bromide in vapor}\end{array}\right)\left(\begin{array}{c}\text{mole percent butadiene}\\\text{in liquid}\end{array}\right)}{\left(\begin{array}{c}\text{Mole percent butadi-}\\\text{ene in vapor}\end{array}\right)\left(\begin{array}{c}\text{mole percent methyl bro-}\\\text{mide in liquid}\end{array}\right)}$$

The values thus obtained were the standard values. Runs were then made by the same procedure except that the various solvents were added. The solvent to be tested was added in an amount so as to comprise 20 mole percent of the total mixture. The total volume in the pressure bottle was regulated so that it was about 100 cc. as in the control run. The results obtained using various solvents according to this invention are shown in the table. The effectiveness of each solvent for the separation of methyl bromide from butadiene can be determined by the deviation of the alpha value from the alpha value of 0.891 obtained between methyl bromide and butadiene in the absence of any solvent. The effectiveness of each solvent for the separation of methyl bromide from each of n-butane, trans butene-2 and cis butene-2 can similarly be determined by the deviation of the alpha values from the respective alpha values of .885, 1.017 and 1.151 respectively between methyl bromide and each of these $C_4$ hydrocarbons. For example, the alpha value of .835 between methyl bromide and butadiene in the presence of benzene may be compared with the alpha value of .891 in the absence of solvent. This significant lowering of the apha value by benzene shows that benzene is an effective contacting solvent for the separation of methyl bromide from, for example, butadiene.

TABLE
*Alpha values between methyl bromide and $C_4$ hydrocarbons*

EFFECT OF AROMATIC CONTACTING SOLVENTS

|  | No. solvent | Benzene | Monochlorobenzene |
|---|---|---|---|
| $\alpha$-Methyl bromide/n-butane | .885 | .785 | .771 |
| $\alpha$-Methyl bromide/trans butene-2 | 1.017 | .961 | .914 |
| $\alpha$-Methyl bromide/cis butene-2 | 1.151 | 1.037 | 1.007 |
| $\alpha$-Methyl bromide/butadiene-1,3 | .891 | .835 | .838 |

Although the process for the removal of methyl bromide has been described utilizing the effluent from a process for the dehydrogenation of hydrocarbons with bromine liberating materials, the invention is applicable to other processes where similar compositions are to be separated. Generally, the organic mixture to be separated will contain at least a total of 10 mol percent of $C_4$ hydrocarbon, and the process is most useful when the composition contains at least about 40 or 50 mol percent $C_4$ hydrocarbons. Normally, most of the hydrocarbons in the total composition containing the methyl bromide will have from 2 to 6 carbon atoms. Other components such as water, nitrogen, oxygen, bromine and so forth may be present also. The mol percent methyl bromide present may vary, but will normally be less than 25 mol percent of the amount of $C_4$ hydrocarbons present. It is an advantage of this invention that the process is useful in separating organic compositions in which the methyl bromide is present in an amount of less than 5 mol percent, such as less than 2 mol percent, based on the total $C_4$ hydrocarbons present. Preferably, the mixture from which the methyl bromide is separated will contain butadiene-1,3, butene-1, butene-2, vinyl acetylene and mixtures of these unsaturated hydrocarbons, such as a composition containing at least a total of 50 mol percent of unsaturated $C_4$ hydrocarbons based on the total organic phase. Another example of a composition containing methyl bromide which could be separated according to this invention would be that obtained when 2-methyl pentene-2 is cracked to isoprene, and the product contains some $C_4$ hydrocarbons.

We claim:

1. A process for the preparation of unsaturated aliphatic hydrocarbons by dehydrogenation which comprises heating a mixture of an aliphatic hydrocarbon to be dehydrogenated and a bromine liberating catalyst at an elevated temperature in a dehydrogenation zone, to produce an effluent comprising $C_4$ unsaturated aliphatic hydrocarbon and methyl bromide, said methyl bromide being present in an amount of less than 25 mol percent based on the $C_4$ hydrocarbons present, and separating the methyl bromide by fractionally distilling said effluent while feeding to the distillation an aromatic contacting solvent, said aromatic contacting solvent having a dielectric constant at 25° C. of less than 9 and being a compound of the formula

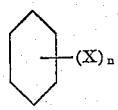

wherein X is selected from the group consisting of $CH_3$, Cl, Br and $NH_2$ and $n$ is a number from 0 to 2, with a purified aliphatic hydrocarbon stream being taken off overhead from the distillation and the methyl bromide being dissolved in the said organic contacting solvent taken off as a bottoms, and returning the said methyl bromide to the dehydrogenation zone as a catalyst.

2. A process for the preparation of unsaturated aliphatic hydrocarbons by dehydrogenation which comprises heating a mixture of an aliphatic hydrocarbon to be dehydrogenated and an ammonium bromide catalyst at an elevated temperature in a dehydrogenation zone, to produce an effluent comprising $C_4$ unsaturated aliphatic hydrocarbon and methyl bromide, said methyl bromide being present in an amount of less than 25 mol percent based on the $C_4$ hydrocarbon present, and separating the methyl bromide by fractionally distilling said effluent while feeding to the distillation an aromatic contacting solvent, said aromatic contacting solvent having a dielectric constant at 25° C. of less than 9 and being a compound of the formula

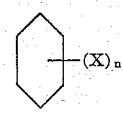

wherein X is selected from the group consisting of $CH_3$, Cl, Br and $NH_2$ and $n$ is a number from 0 to 2, with a purified aliphatic hydrocarbon stream being taken off overhead from the distillation and the methyl bromide being dissolved in the said organic contacting solvent taken off as a bottoms, and returning the said methyl bromide to the dehydrogenation zone as a catalyst.

3. A process for the preparation of unsaturated aliphatic hydrocarbons by dehydrogenation which comprises heating a mixture of an aliphatic hydrocarbon to be dehydrogenated, steam and a bromine liberating catalyst at an elevated temperature in a dehydrogenation zone to produce an effluent comprising $C_4$ unsaturated aliphatic hydrocarbon, steam and methyl bromide, said methyl bromide being present in an amount of less than 25 mol percent based on the $C_4$ hydrocarbons present, condensing out steam to form an aqueous phase, separating said aqueous phase from the remaining organic phase and separating the methyl bromide by fractionally distilling said organic phase while feeding to the distillation an aromatic contacting solvent, said methyl bromide being present in an amount of less than 5 mol percent based on the $C_4$ hydrocarbons present, said aromatic contacting solvent having a dielectric constant at 25° C. of less than 9 and being a compound of the formula

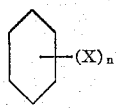

wherein X is selected from the group consisting of $CH_3$, Cl, Br, and $NH_2$ and $n$ is a number from 0 to 2, with a purified aliphatic hydrocarbon stream being taken off overhead from the distillation and the methyl bromide being dissolved in the said organic contacting solvent taken off as a bottoms, and returning bromine to the dehydrogenation zone as a catalyst.

4. A process for the preparation of butadiene-1,3 by dehydrogenation of butene which comprises heating a mixture of butene and a bromine liberating catalyst at an elevated temperature in a dehydrogenation zone, to produce an effluent comprising butene, butadiene-1,3 and methyl bromide, said methyl bromide being present in an amount of less than 5 mol percent based on the $C_4$ hydrocarbons present, and separating the methyl bromide by fractionally distilling said effluent in contact with benzene, with a purified aliphatic hydrocarbon stream being taken off overhead from the distillation and the methyl bromide being dissolved in the said organic contacting solvent taken off as bottoms, and returning the said methyl bromide to the dehydrogenation zone as a catalyst.

5. A process for the preparation of unsaturated aliphatic hydrocarbons of 4 carbon atoms by dehydrogenation which comprises heating a mixture of a 4 carbon aliphatic hydrocarbon to be dehydrogenated and a bromine liberating catalyst at an elevated temperature in a dehydrogenation zone, to produce an effluent comprising a 4 carbon unsaturated aliphatic hydrocarbon and methyl bromide, said methyl bromide being present in an amount of less than 5 mol percent based on the C₄ hydrocarbons present, and separating the methyl bromide by fractionally distilling said effluent in contact with chlorobenzene, with a purified aliphatic hydrocarbon stream being taken off overhead from the distillation and the methyl bromide being dissolved in the said organic contacting solvent taken off as a bottoms, and returning the said methyl bromide to the dehydrogenation zone as a catalyst.

6. A process for the preparation of butadiene-1,3 which comprises heating a gaseous mixture of butene, oxygen, steam, ammonium bromide and methyl bromide to a temperature of at least 400° C. in a dehydrogenation zone to produce a gaseous dehydrogenation zone effluent containing hydrocarbons, steam, ammonium bromide, hydrogen bromide, elemental bromide and methyl bromide, said methyl bromide being present in an amount of less than 2 mol percent based on the C₄ hydrocarbons present, cooling the dehydrogenation zone effluent to condense the steam into an aqueous phase containing elemental bromine and inorganic compounds thereof, separating from the remaining gaseous mixture of hydrocarbons and methyl bromide the condensed aqueous phase containing the ammonium bromide, hydrogen bromide and elemental bromine; liquifying the remaining gaseous mixture of hydrocarbons and methyl bromide and separating the methyl bromide by fractionally distilling the resulting liquified mixture of hydrocarbons and methyl bromide while feeding to the distillation an aromatic contacting solvent, said methyl bromide being present in an amount of less than 5 mol percent based on the C₄ hydrocarbon present, said aromatic contacting solvent having a dielectric constant at 25° C. of less than 9 and being a compound of the formula

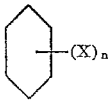

wherein X is selected from the group consisting of CH₃, Cl, Br and NH₂ and $n$ is a number from 0 to 2, with a purified aliphatic hydrocarbon stream being taken off overhead from the distillation and the methyl bromide being dissolved in the said organic contacting solvent taken off as a bottoms, and returning the said methyl bromide to the dehydrogenation zone as a catalyst.

7. A process for the preparation of butadiene-1,3 which comprises heating a gaseous mixture of butene, oxygen, steam, ammonium bromide and methyl bromide to a temperature of at least 400° C. in a dehydrogenation zone to produce a dehydrogenation zone effluent, cooling the dehydrogenation zone effluent to condense the steam into an aqueous phase containing elemental bromine and inorganic compounds thereof, separating from the remaining gaseous mixture of hydrocarbons and methyl bromide the condensed aqueous phase containing ammonium bromide, hydrogen bromide and elemental bromine; liquifying the mixture of hydrocarbons and methyl bromide, and separating the methyl bromide by fractionally distilling the resulting liquified mixture while feeding to the distillation an aromatic contacting solvent, said methyl bromide being present in an amount of less than 2 mol percent based on the C₄ hydrocarbons present, said aromatic contacting solvent being benzene, with a purified aliphatic hydrocarbon stream being taken off overhead from the distillation and the methyl bromide being dissolved in the said organic contacting solvent taken off as a bottoms, and returning the said methyl bromide to the dehydrogenation zone as a catalyst.

8. A process for separating a mixture of methyl bromide and aliphatic hydrocarbons of 4 carbon atoms which comprises fractionally distilling the said mixture while feeding to the distillation an aromatic contacting solvent, said methyl bromide being present in an amount of less than 2 mol percent based on the C₄ hydrocarbons present, said aromatic contacting solvent having a dielectric constant at 25° C. of less than 9 and being a compound of the formula

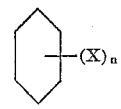

wherein X is selected from the group consisting of CH₃, Cl, Br and NH₂ and $n$ is a number from 0 to 2, with a purified aliphatic hydrocarbon stream being taken off overhead from the distillation and the methyl bromide being dissolved in the said organic contacting solvent taken off as a bottoms.

9. A process for separating a mixture of methyl bromide and aliphatic hydrocarbons of 2 to 6 carbon atoms, said mixture containing hydrocarbons of 4 carbon atoms, which comprises fractionally distilling the said mixture while feeding to the distillation an aromatic contacting solvent, said methyl bromide being present in an amount of less than 5 mol percent based on the C₄ hydrocarbons present, said aromatic contacting solvent having a dielectric constant at 25° C. of less than 9 and being a compound of the formula

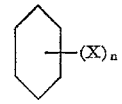

wherein X is selected from the group consisting of CH₃, Cl, Br and NH₂ and $n$ is a number from 0 to 2, with a purified aliphatic hydrocarbon stream being taken off overhead from the distillation and the methyl bromide being dissolved in the said organic contacting solvent taken off as a bottoms.

10. A process for separating a mixture of methyl bromide and aliphatic hydrocarbons of 4 carbon atoms, said methyl bromide being present in an amount of less than 5 mol percent based on the C₄ hydrocarbons present, which comprises fractionally distilling the said mixture while feeding benzene to the distillation.

11. A process for separating a mixture of methyl bromide and aliphatic hydrocarbons of 4 carbon atoms, said methyl bromide being present in an amount of less than 5 mol percent based on the C₄ hydrocarbons present, containing butadiene-1,3 which comprises fractionally distilling the said mixture while feeding chlorobenzene to the distillation.

12. A process for separating a mixture of methyl bromide and butadiene-1,3 which comprises fractionally distilling the said mixture while feeding to the distillation an aromatic contacting solvent, said methyl bromide being present in an amount of less than 2 mol percent based on the C₄ hydrocarbons present, said aromatic contacting solvent having a dielectric constant at 25° C. of less than 9 and being a compound of the formula

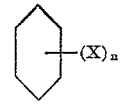

wherein X is selected from the group consisting of CH₃, Cl, Br and NH₂ and $n$ is a number from 0 to 2, with a purified aliphatic hydrocarbon stream being taken off overhead from the distillation and the methyl bromide being dissolved in the said organic contacting solvent taken off as a bottoms.

References Cited by the Examiner

FOREIGN PATENTS 807,149  1/59  Great Britain.

OTHER REFERENCES

Weissberger: "Distillation—Technique of Organic Chemistry, vol. IV," published by Interscience Pub., Inc., New York, 1951, pages 338–340.

ALPHONSO D. SULLIVAN, *Primary Examiner.*
DANIEL E. WYMAN, *Examiner.*